(12) United States Patent
Silich

(10) Patent No.: US 9,372,841 B2
(45) Date of Patent: Jun. 21, 2016

(54) 4-DIMENSIONAL GEOMETRIC READING

(71) Applicant: Bert A. Silich, Harrison Township, MI (US)

(72) Inventor: Bert A. Silich, Harrison Township, MI (US)

(*) Notice: Subject to any disclaimer, the term of this patent is extended or adjusted under 35 U.S.C. 154(b) by 612 days.

(21) Appl. No.: 13/778,635

(22) Filed: Feb. 27, 2013

(65) Prior Publication Data

US 2013/0227404 A1   Aug. 29, 2013

Related U.S. Application Data

(60) Provisional application No. 61/603,654, filed on Feb. 27, 2012.

(51) Int. Cl.
*G06F 17/22*   (2006.01)
*G06F 17/21*   (2006.01)

(52) U.S. Cl.
CPC .......... *G06F 17/2264* (2013.01); *G06F 17/211* (2013.01)

(58) Field of Classification Search
CPC ............ G06F 17/30905; G06F 17/30056; G06F 17/217; G06F 17/211
See application file for complete search history.

(56) References Cited

U.S. PATENT DOCUMENTS

| | | | | |
|---|---|---|---|---|
| 7,322,981 B2* | 1/2008 | Jackson | ............. | A61B 17/7037 606/266 |
| 7,899,249 B2* | 3/2011 | Furmaniak | ......... | G06K 9/00469 382/176 |
| 8,014,013 B2* | 9/2011 | Owen | ................... | G06F 3/1205 358/1.15 |
| 8,624,928 B2* | 1/2014 | Chang | ................... | G06F 3/0488 345/661 |
| 2010/0146413 A1* | 6/2010 | Yu | ..................... | G06F 17/30905 715/760 |
| 2011/0016416 A1* | 1/2011 | Meretab | ............. | G06F 17/2229 715/764 |
| 2012/0057845 A1* | 3/2012 | Obana | ............... | G06F 17/30244 386/241 |

* cited by examiner

*Primary Examiner* — Kyle Stork
(74) *Attorney, Agent, or Firm* — Brooks Kushman P.C.

(57) ABSTRACT

A device includes a display screen and a processor. The processor is configured to convert a textual document into sequentially ordered portions of text and display at the same designated location on the display screen the portions of text one at a time in the sequential order for a user to read.

8 Claims, 19 Drawing Sheets

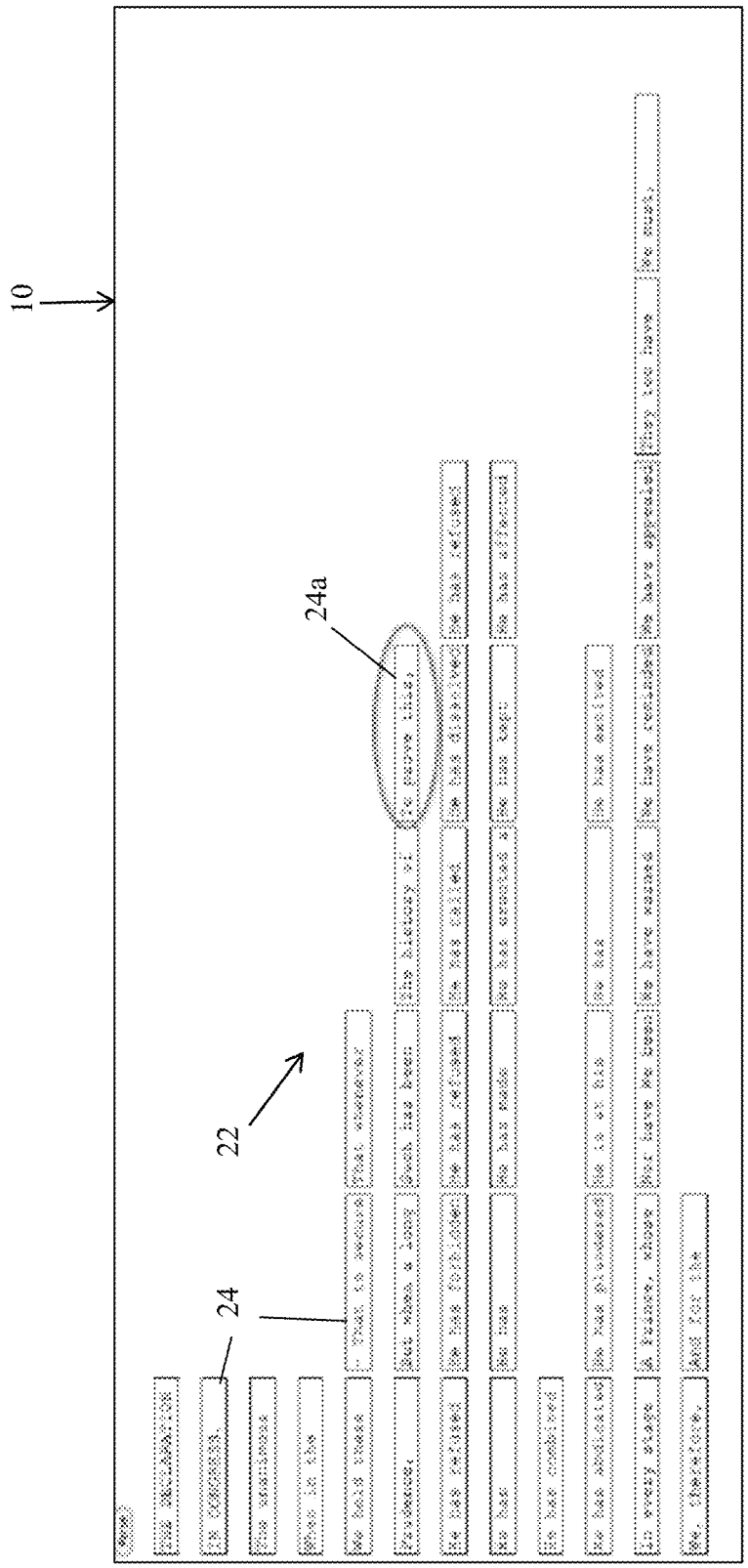
FIG. 3.1

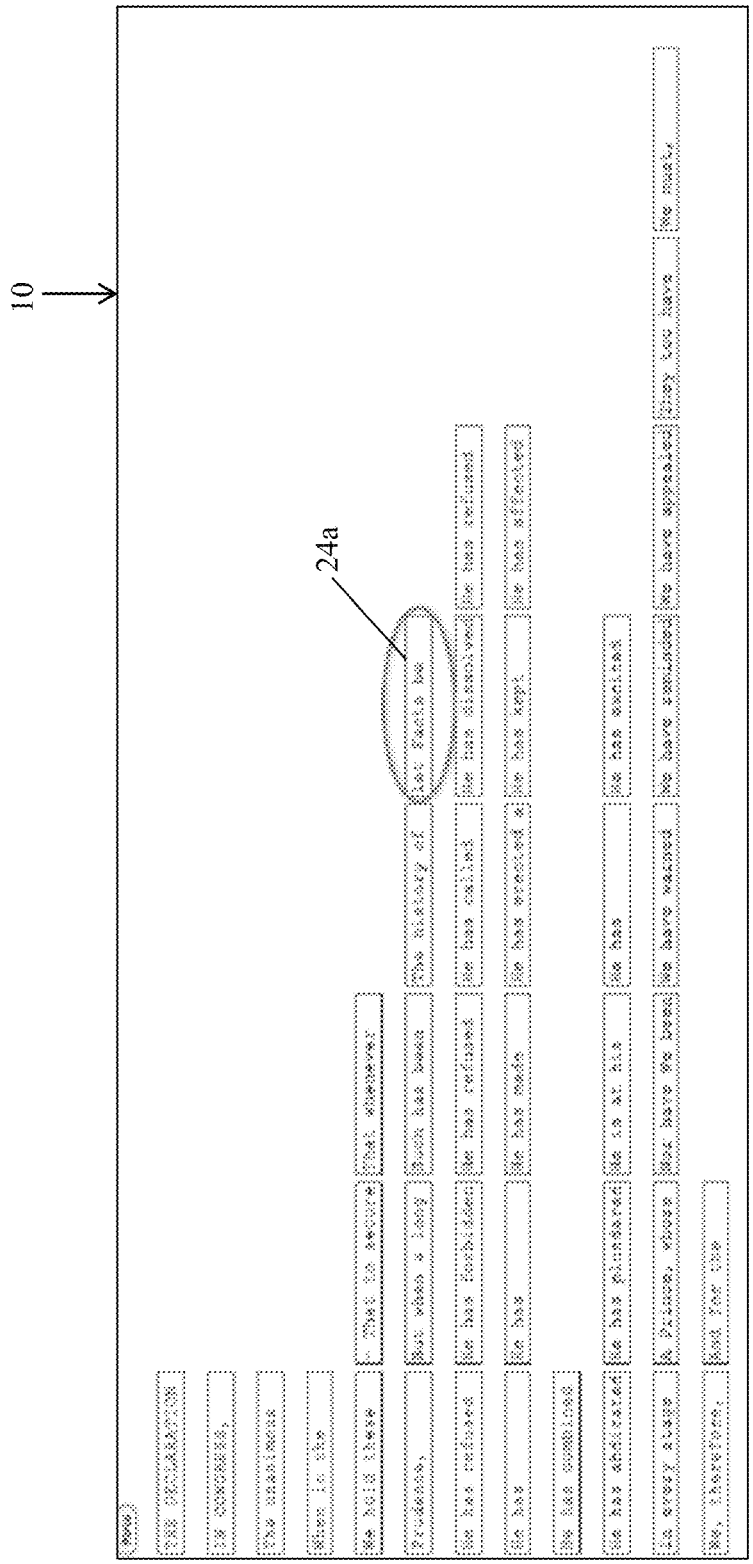
FIG. 3.2

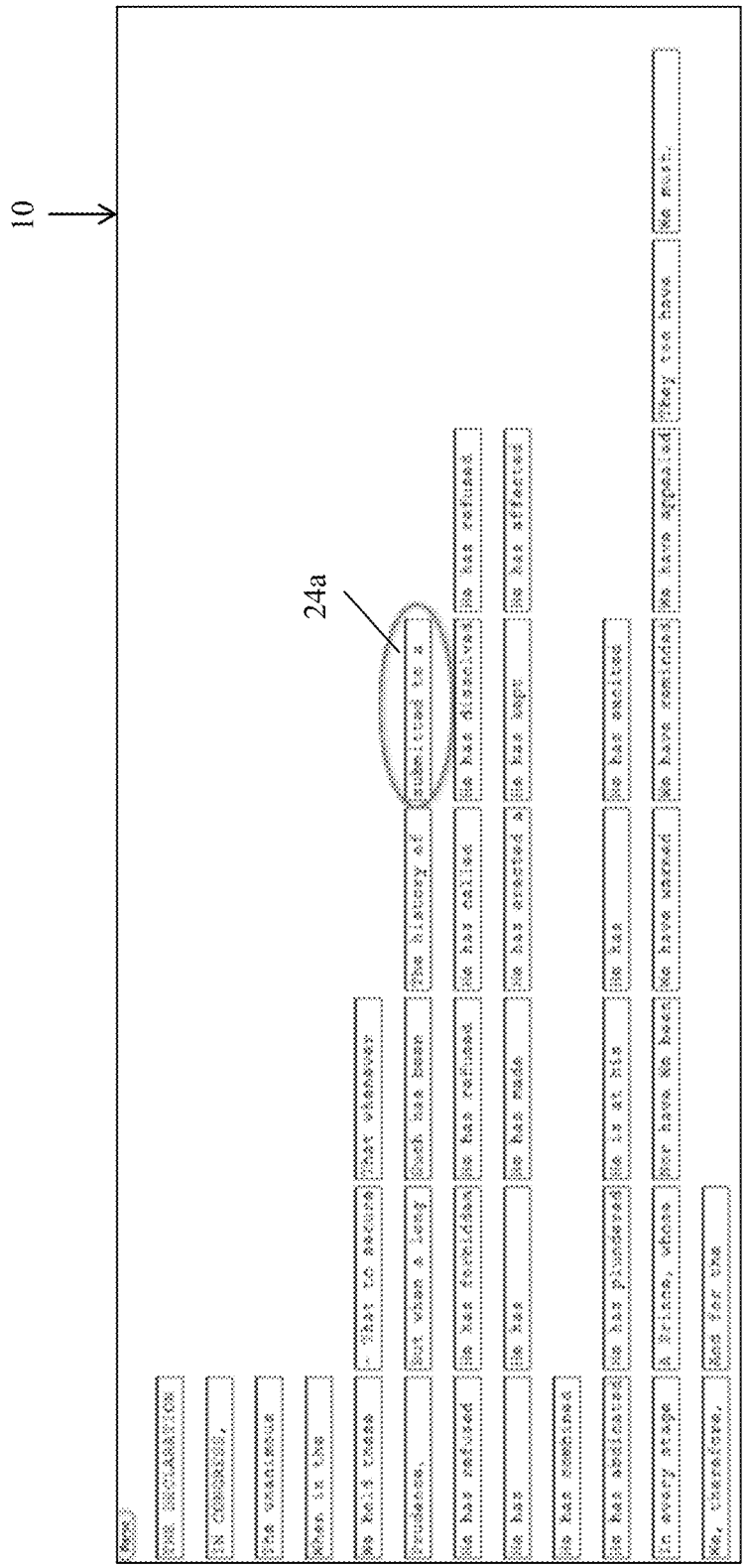
FIG. 3.3

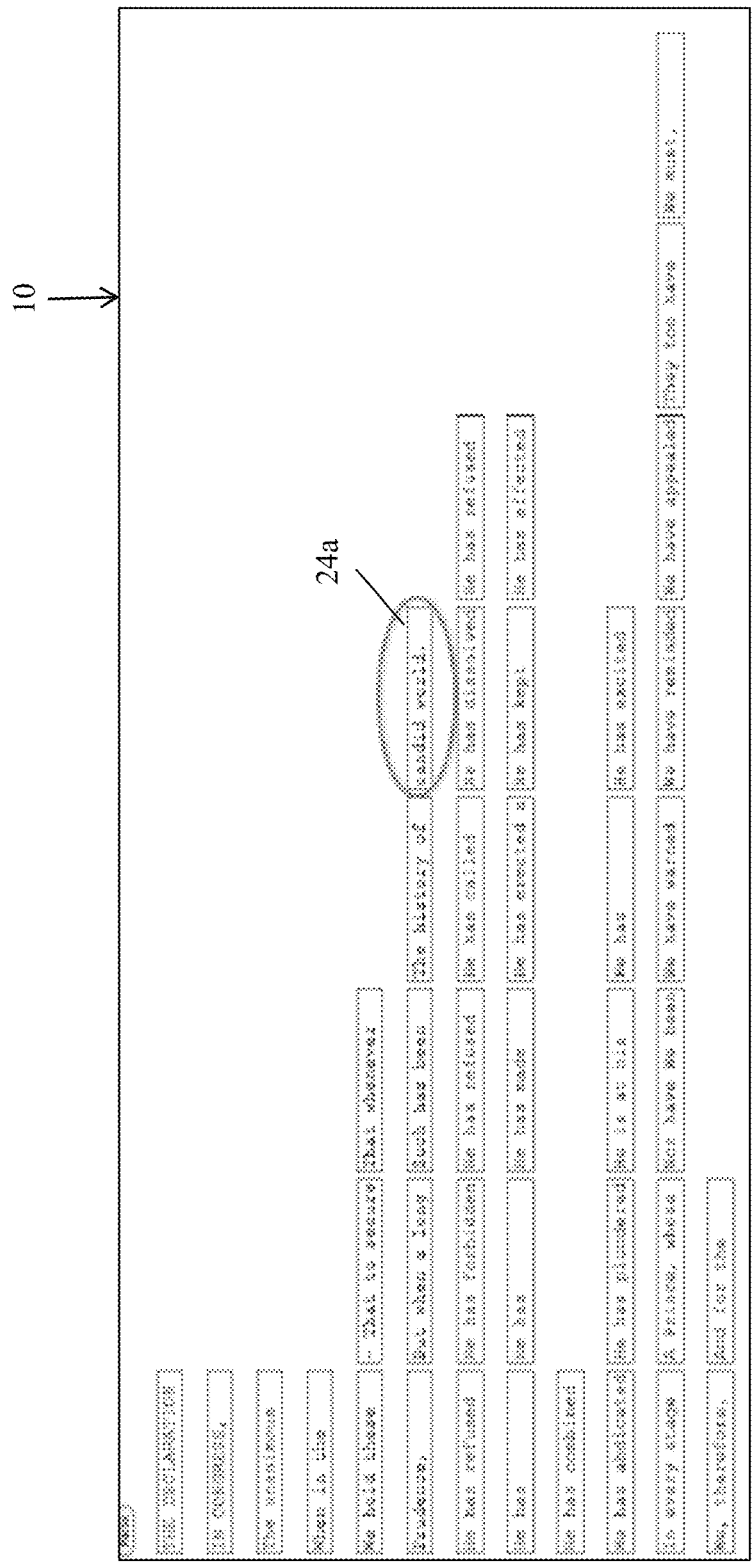
FIG. 3.4

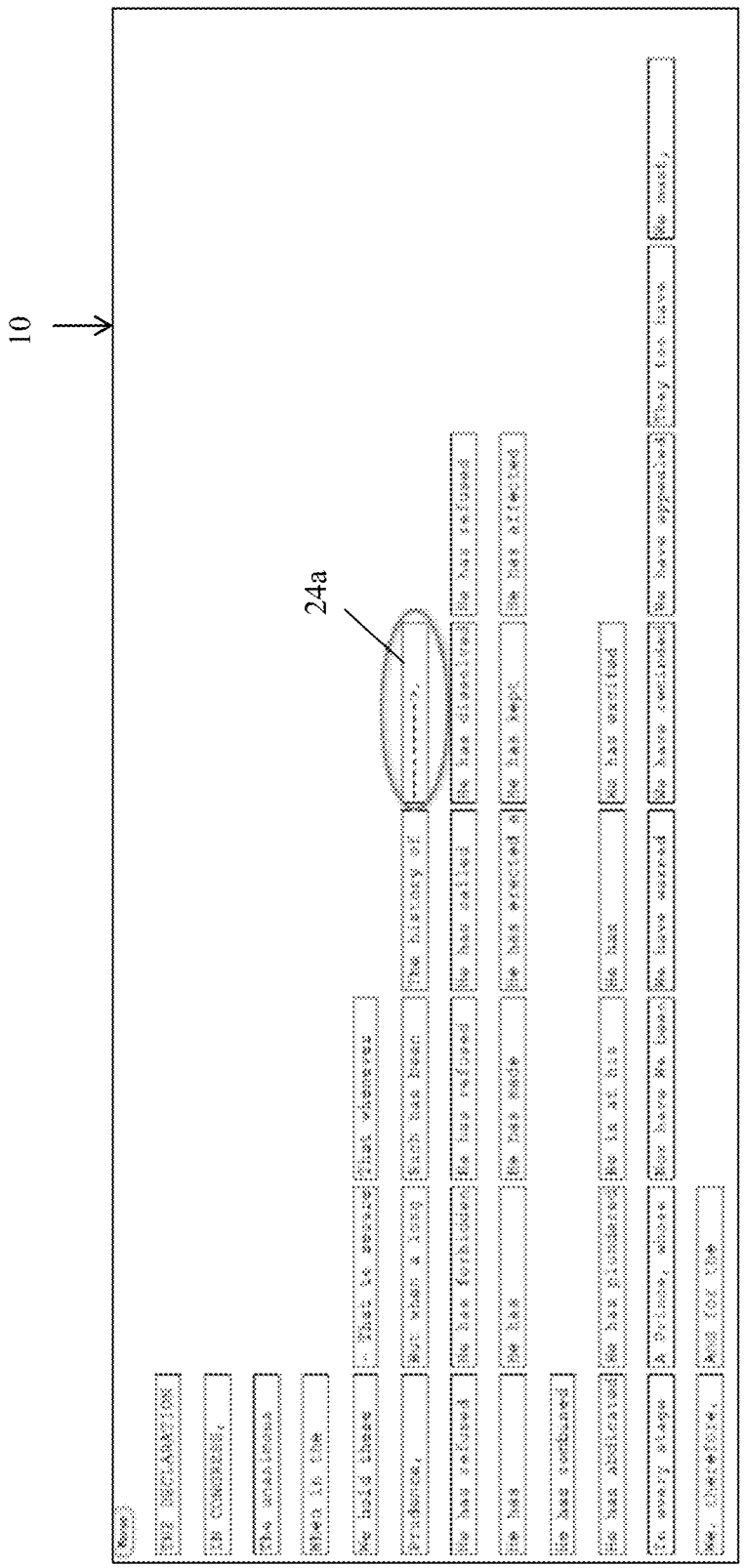
FIG. 3.5

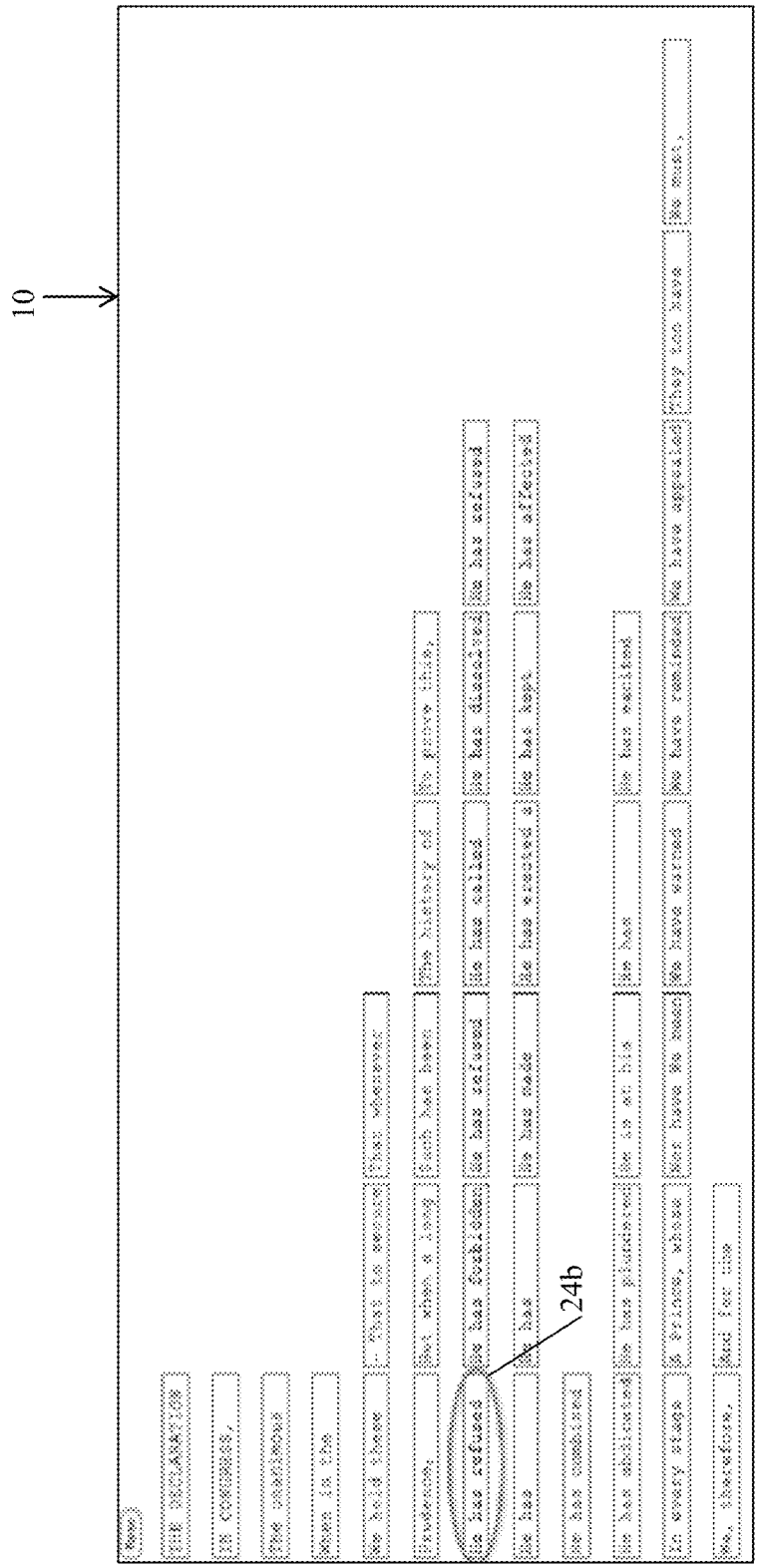
FIG. 3.6

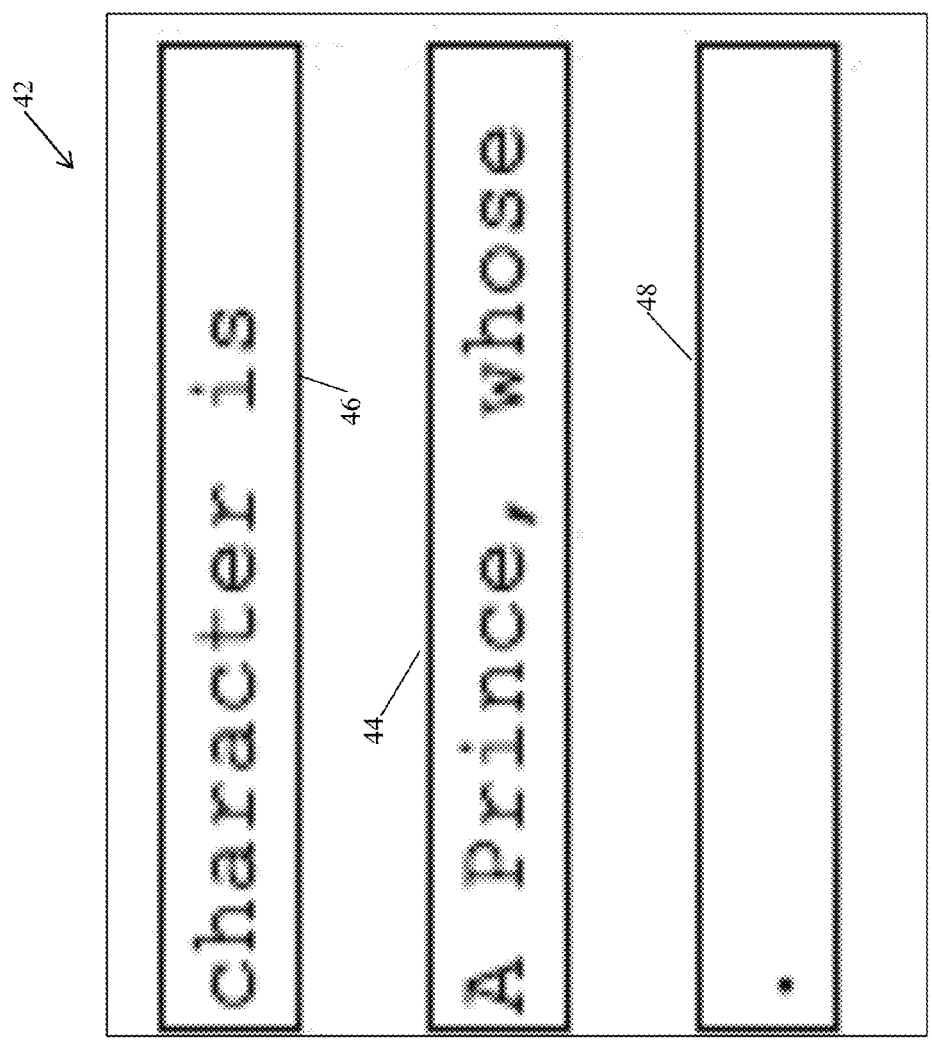
FIG. 4.1

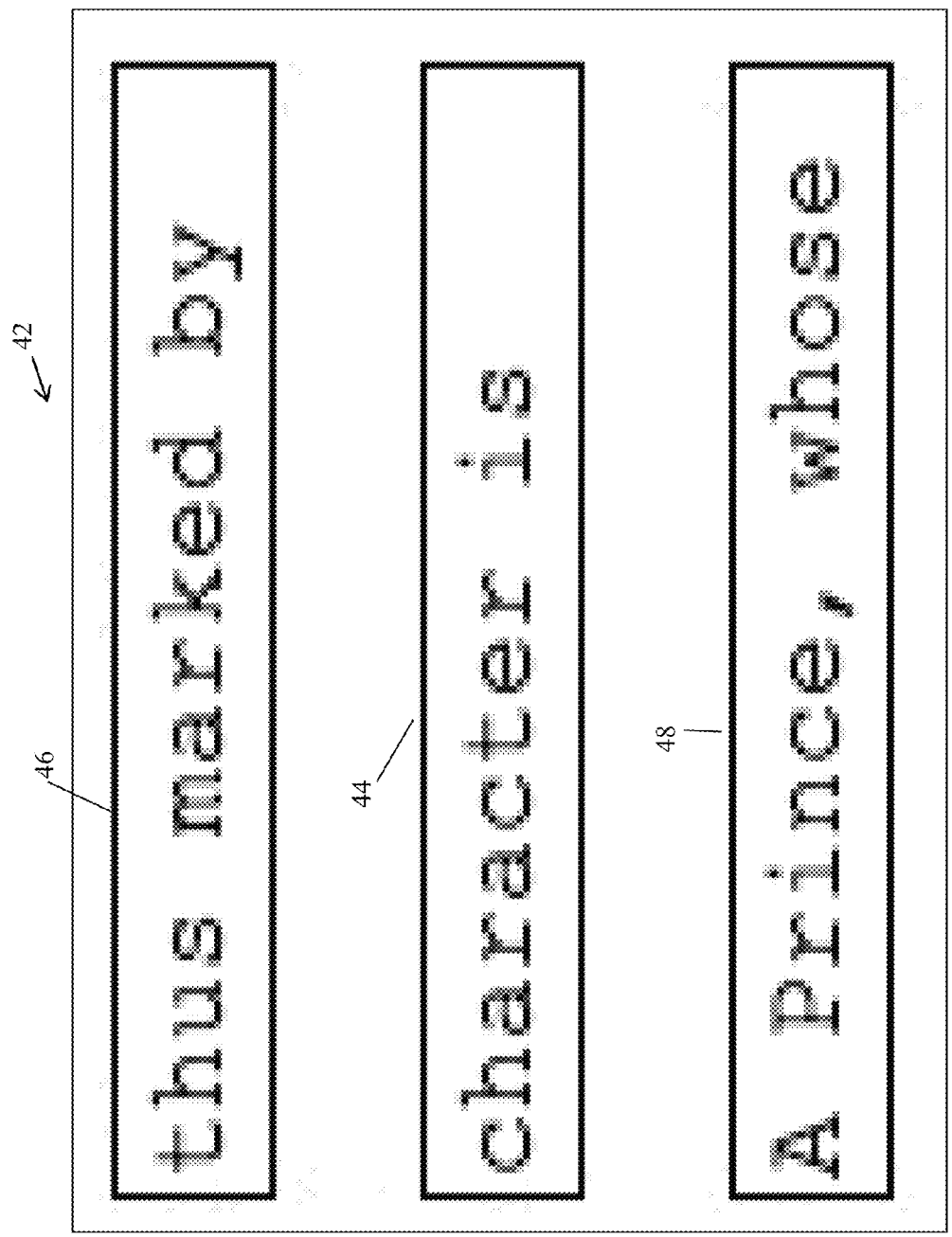
FIG. 4.2

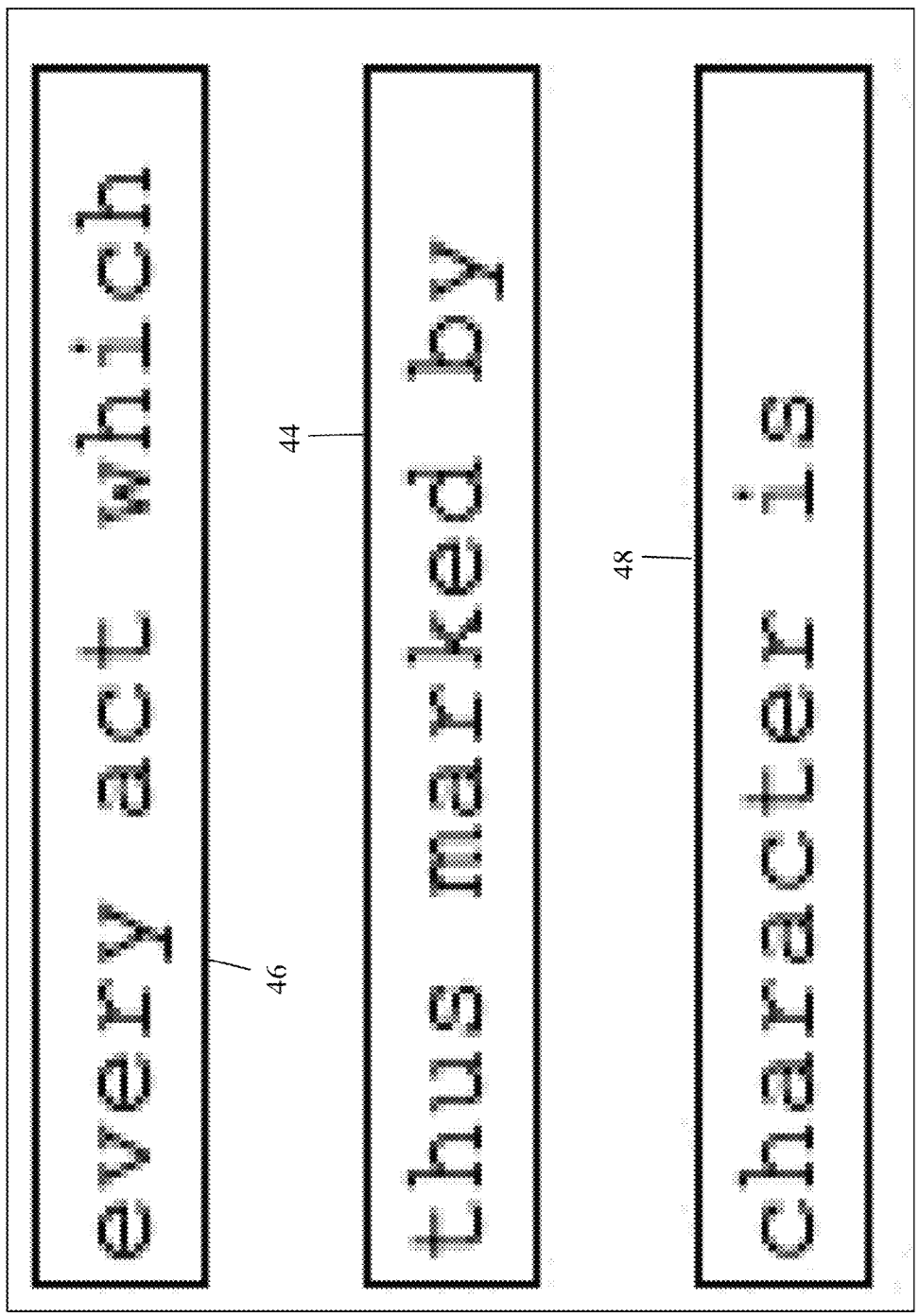
FIG. 4.3

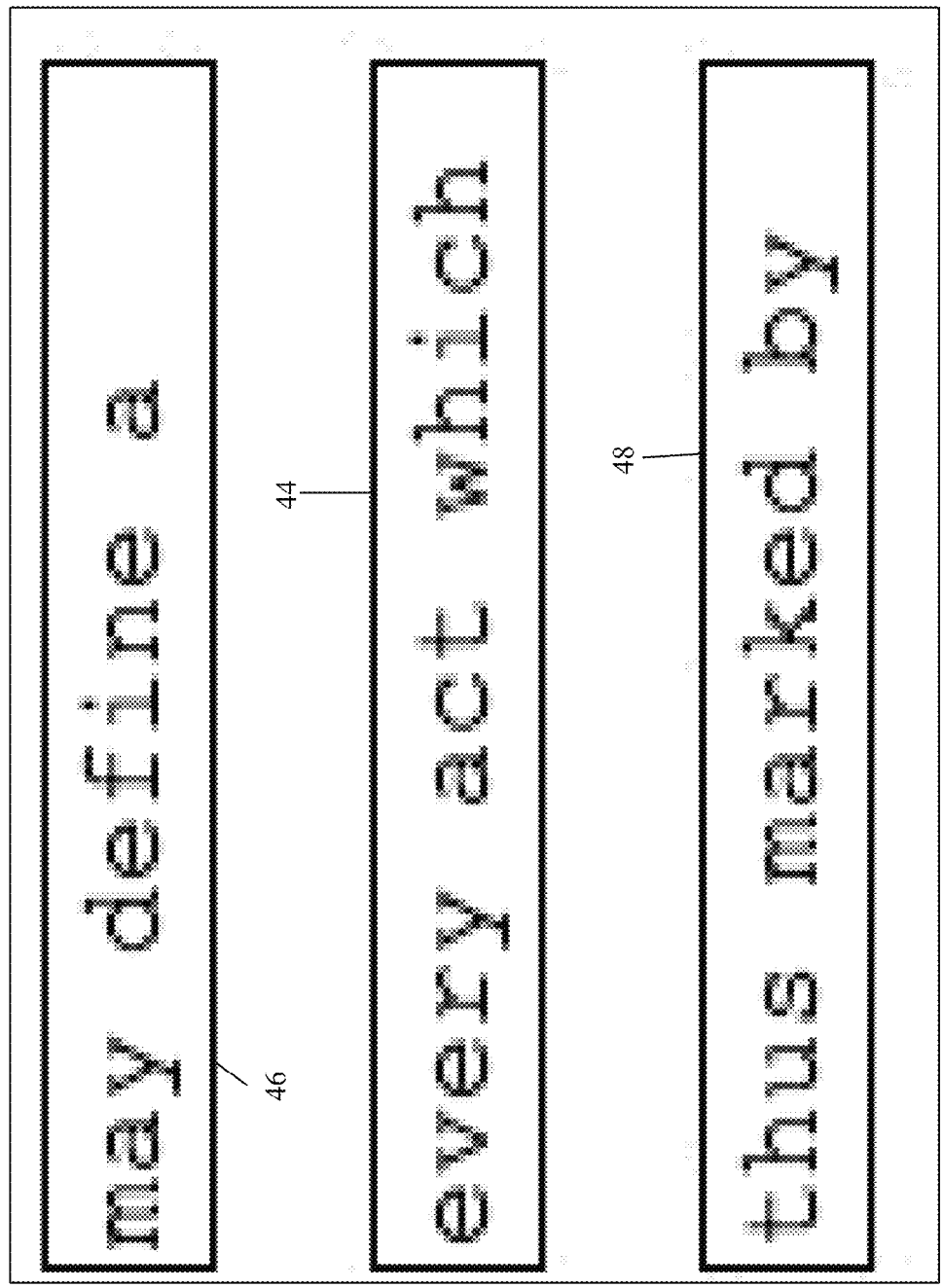
FIG. 4.4

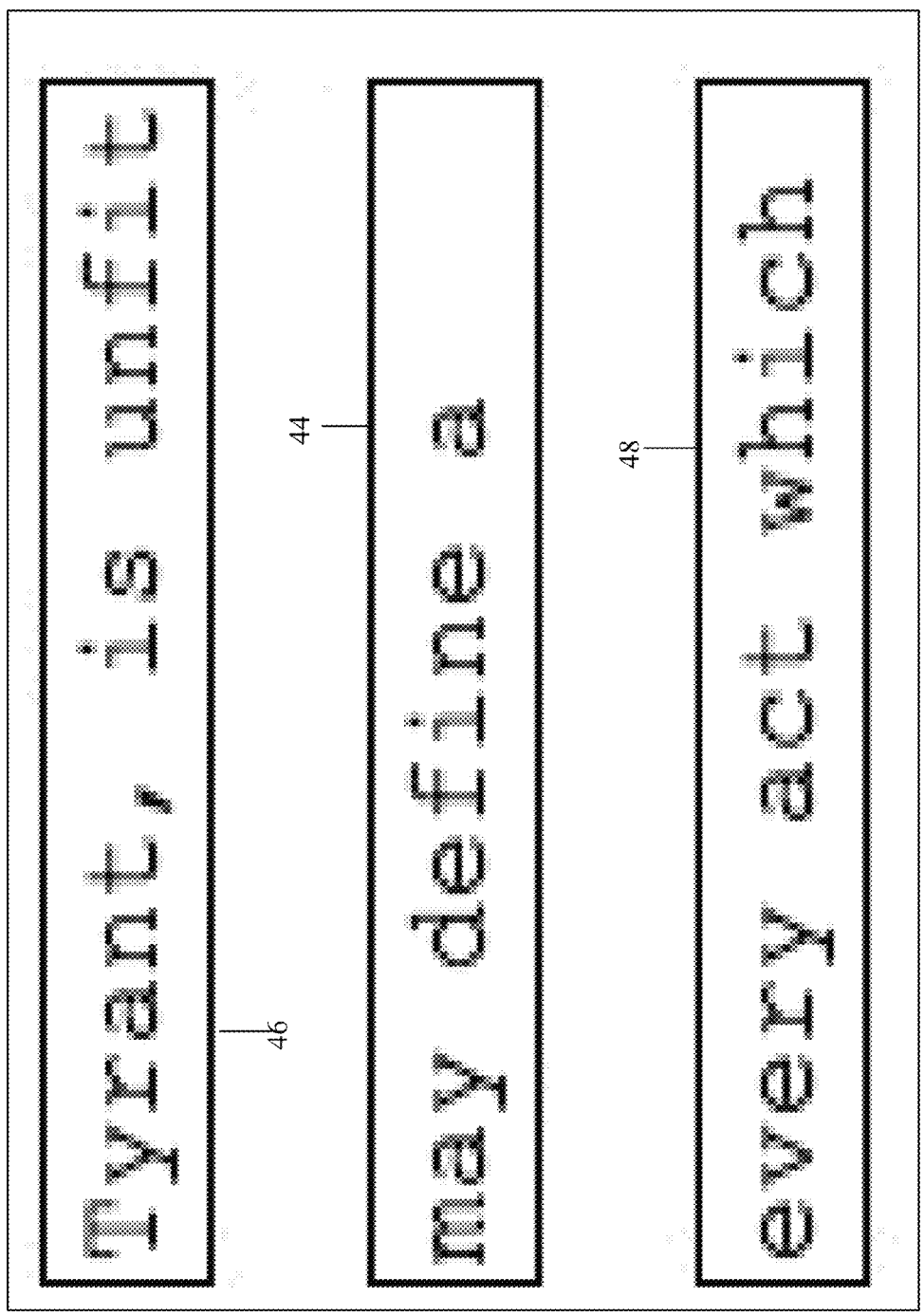
FIG. 4.5

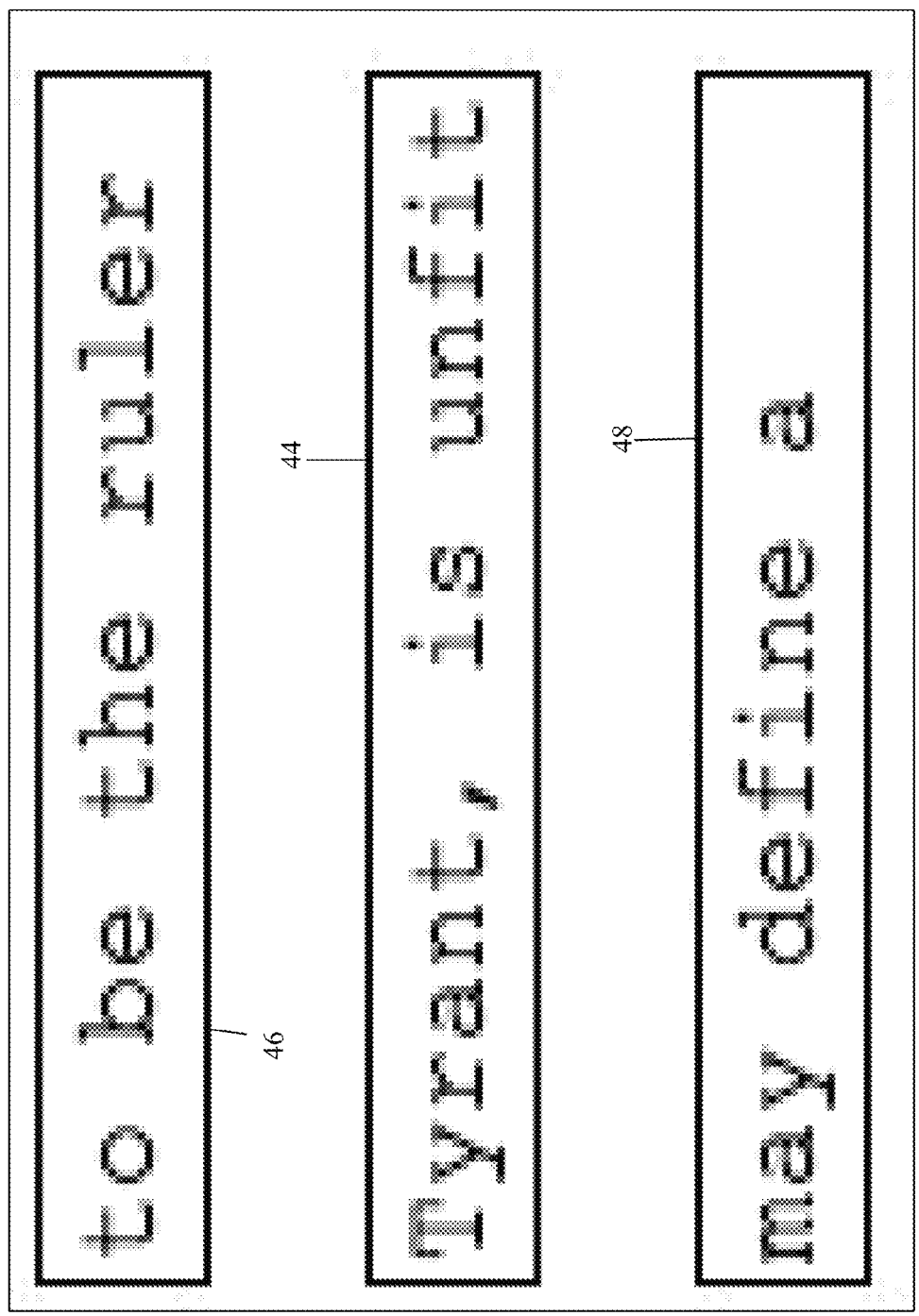
FIG. 4.6

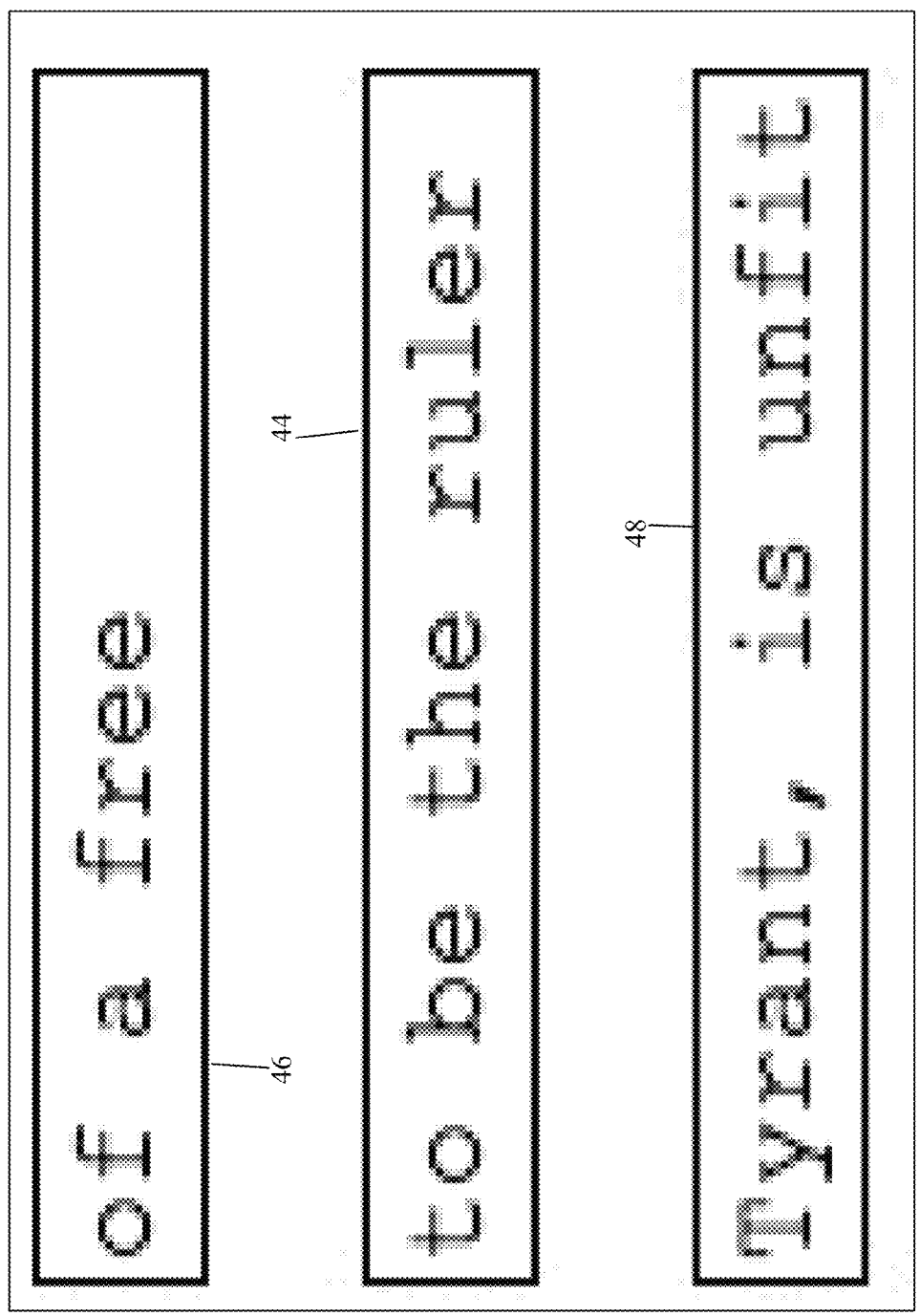
FIG. 4.7

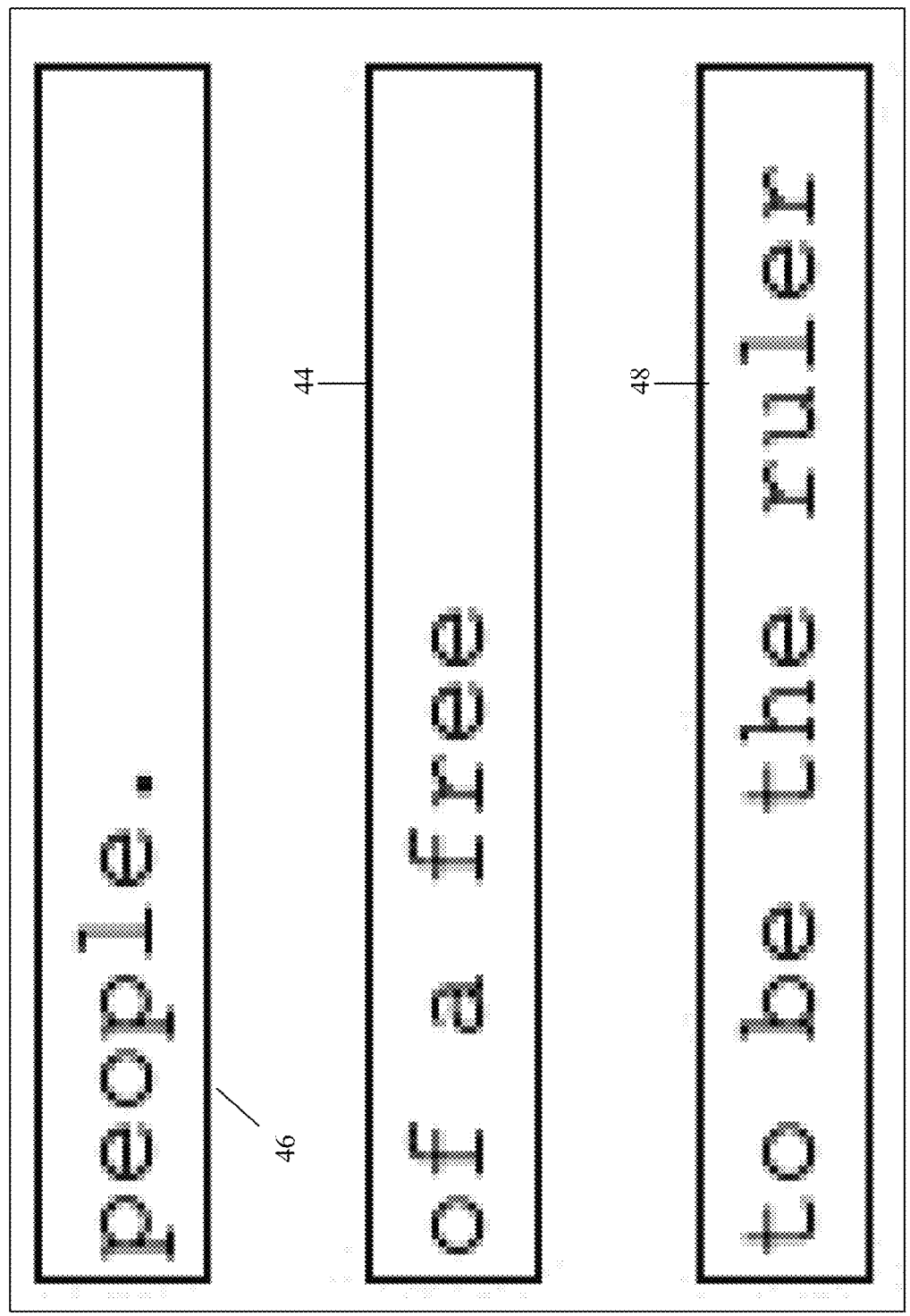
FIG. 4.8

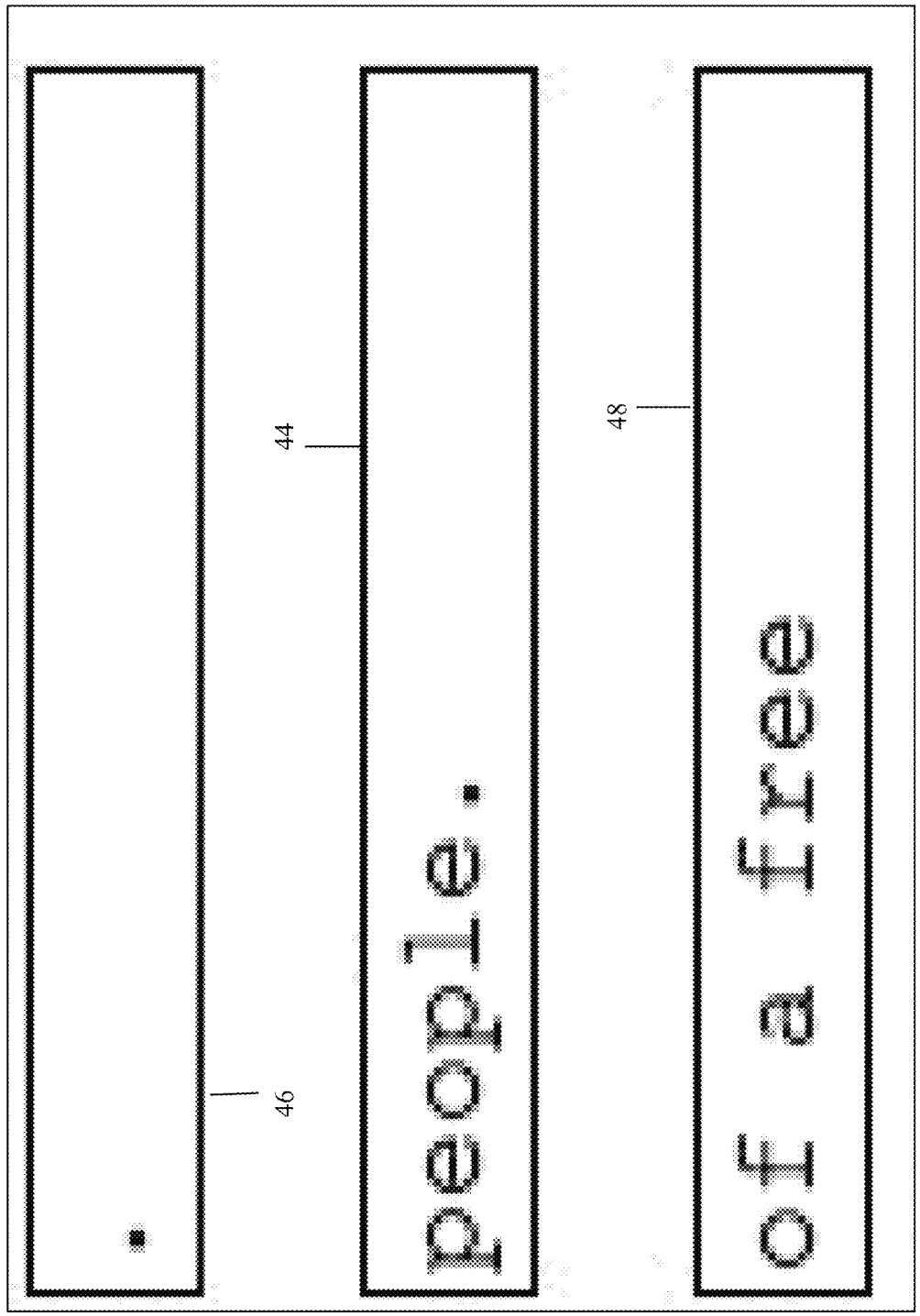
FIG. 4.9

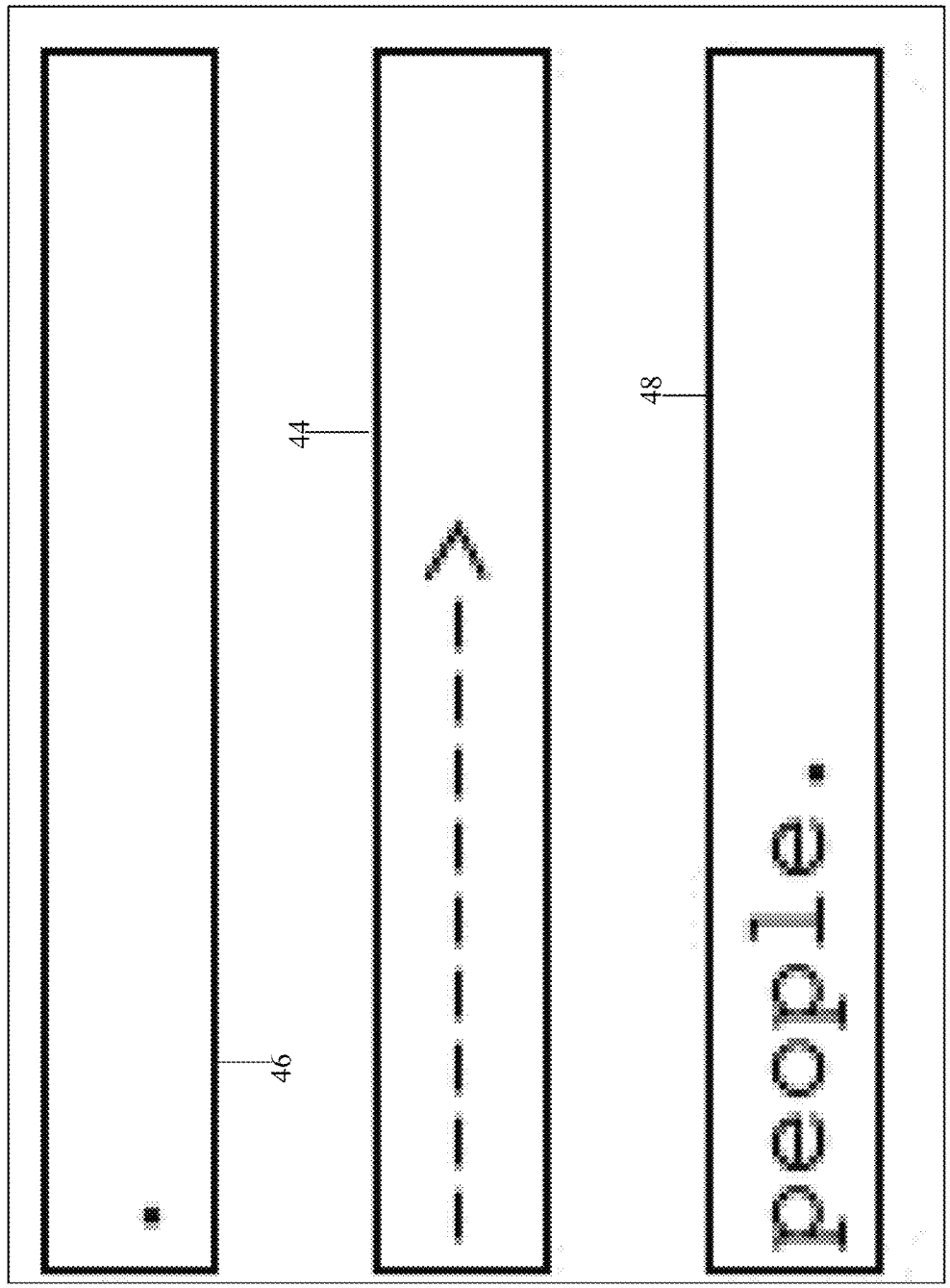
FIG. 4.10

4-DIMENSIONAL GEOMETRIC READING

CROSS-REFERENCE TO RELATED APPLICATIONS

This application claims the benefit of U.S. Provisional Application No. 61/603,654, filed Feb. 27, 2012; the disclosure of which is incorporated in its entirety by reference herein.

TECHNICAL FIELD

The present invention is related to displaying information on a display device.

BACKGROUND

Electronic visual displays are commonly used to display information (e.g., text, graphics, etc.). Text and graphics are displayed on electronic screens for communicating by reading. For effective communication and better visibility, a user often has the ability to select the size of the text presented. Larger text limits the amount of information available per display area, but makes reading the text easier. Smaller text makes more information available per display area, but makes reading the text more difficult. As technology advances, display screens are capable of being smaller. This further limits the amount of information that can be seen, especially when larger text is used. For smaller screens, the only option to display the same amount of information is to proportionately decrease the text size. This can make the information more difficult to read and create eyestrain. If a user requires the text size to remain unchanged as the display screen decreases in size, then the displayed amount of information is decreased using current text layouts.

SUMMARY

Embodiments of the present invention are directed to a method of displaying information (e.g., "text") on a display device (i.e., display screen) in specific compressed forms. In particular, the method of displaying text is done using a display format different from typical ways of displaying text on the display device. The display format allows a user (e.g., a reader or an author) to display portions of the text the user deems important for emphasis and hide the remaining or less important portions of the text from display. All of the text is continuously available for display on the display device to the user whenever wanted.

The display format in accordance with embodiments of the present invention entails displaying the text on the display device such that the user will read the text generally in blocks (i.e., segments) of words of the text. The blocks of text are displayed on the display device with the remaining portions of the text not being displayed on the display device. The remaining portions of the text are continuously available for display within the blocks on the display device. For instance, after an initial portion of text has been displayed within a block for the user to read, the subsequent portion of text will be displayed within that same block for the user to read in place of the initial portion of the text. This process continues to enable the reader to read subsequent text.

In one embodiment, each block contains the same amount of words of the text. For instance, each block contains one, two, three, four, or more words of the text. The amount of words contained in each block is selectable by the user. Again, the words of the text contained in these blocks are displayed on the display device with the remaining words of the text not being displayed. The words of the text contained in the blocks are displayed on the display device in an order as being part of the corresponding blocks.

In another embodiment, the blocks have the same width. In this case, each block contains as many words of the text as possible that fit into the block width to be displayed. For instance, with a block width of nine characters of text, one block may contain three words ("I am here") whereas another block may contain only one word ("whenever"). Again, the block width is selectable by the user and the words of the text contained in these blocks are displayed on the display device with the remaining words of the text not being displayed. Likewise, the words of the text contained in the blocks are displayed on the display device in an order as being part of the corresponding blocks.

Each block is assigned to a given structure such as a sentence (described in greater detail below). The given structure is not restricted to a sentence and can alternatively be selected by the user to be assigned as an entire paragraph or page, for example. If sentences are respectively assigned to the blocks, then each sentence will be displayed on the display device such that the sentence is read by the user within the block assigned to the sentence. For example, assuming the user selects the block size to be three words, the sentence will be displayed three words at a time in sequential order until the sentence is completed. The user will then direct attention to the next block which is assigned to the next sentence. Likewise, if paragraphs are respectively assigned to the blocks, then each paragraph will be displayed on the display device such that the paragraph is read by the user within the block assigned to the paragraph. For example, again assuming the user selects the block size to be three words, the paragraph (including all of the sentence(s) therein) will be displayed three words at a time in sequential order until the paragraph is completed. The user will then direct attention to the next block which is assigned to the next paragraph.

The blocks according to any of the user-defined structures are displayed on the display device right-to-left and up-to-down in the usual Western manner for a Western style reader. In the exemplary variation, each sentence is associated with its own block. The blocks can be arranged in patterns consistent with other cultural styles of reading. As a result, the eyes do not have to move or scan and refocus until a sentence has been completed. Since the eyes can read an entire sentence without moving, the user does not have to spend time to refocus and eye fatigue can thereby be reduced. Again, the sentence corresponding to a block is displayed such that the user reads the sentence within the block. For example, again assuming the user selects the block size to be three words, the sentence will be displayed three words at a time in sequential order within the block until the sentence is completed. After the user completes reading the sentence from the block, the user scans the eyes to the next block for the next sentence. This next block is either displayed on the display device to the right of the just completed block or on the next line underneath the line having the just completed block. The user then begins reading the next sentence from this new block in the same manner as describe above. Namely, three words of this next sentence are displayed at a time within this new block until this next sentence has been completed. The process continues with the subsequent block for the subsequent sentence and so on. Just as sentences are broken up into paragraphs, the blocks for the sentences are likewise displayed within corresponding paragraphs. This technique for reading can also be an advantage for people who may have difficulty reading such as the elderly or those with visual impairments (e.g., macular degeneration).

The method of displaying text on a display device using a display format in accordance with embodiments of the present invention includes the following operation. Initially, a full text document is selected. The document is then manipulated by a personal handheld device, application, computer program, web based program, etc., into the display format. Again, the display format entails displaying the text on the display device such that the user reads the text in blocks of words of the text. After the document is manipulated into the display format, the user reviews the new blocked version of the text. In one variation, each block displays the beginning text of a corresponding sentence of the text. In another variation, each block displays the text selected by the user (i.e., designated by the user as being important) in a corresponding sentence of the text. In either event, a quick review of the blocks allows the user to see the basics of what information is contained in each sentence and an idea of the topic in the full document. The full detailed version of the document is always available for display on the display device for the user to refer whenever desired. As the user reads the text from the blocks the user can redefine the text the user finds most interesting and change the user preferences as the user becomes familiar with the material of the document.

Once the user is done the new revised abridged display version of the document can be saved. The new display version meets the user requirements as described above. When the user returns to review the text, the display device now displays the blocks of text that the user selected. If further display detail of the text is desired by the user, then the user can read the text in between the blocks to fill in details or expand the abridged text to view the entire text. One way of accomplishing this is to lengthen a block's size to where an entire sentence can be seen within that block. If the text is set up in this blocked sentence manner, then the user can easily manually browse the text looking for the topic the user previously blocked and then read any level of information around this block. The full text can alternately be displayed on the display device in a separate window from the blocked text. These different windows can be viewed individually or simultaneously based on the user's preference.

BRIEF DESCRIPTION OF THE DRAWINGS

FIGS. 3.1 through 3.6 respectively illustrate the Declaration of Independence as displayed on a display device in the display format in which the first few words of each sentence are displayed in blocks of text according to the embodiment shown in FIG. 2 with attention brought to the block corresponding to the sixth paragraph, fifth sentence of the Declaration of Independence, whereby progressing sequentially through FIGS. 3.1 through 3.4 illustrates how this sentence is displayed for a user to read, with a visual cue (FIG. 3.5) at the end of this sentence directing the user to the next sentence (FIG. 3.6), which happens to be the first sentence of paragraph seven;

FIGS. 4.1 through 4.10 illustrate an advanced combination of block arrangement as displayed on a display device in a display format in accordance with an embodiment of the present invention.

DETAILED DESCRIPTION

Figure 1:
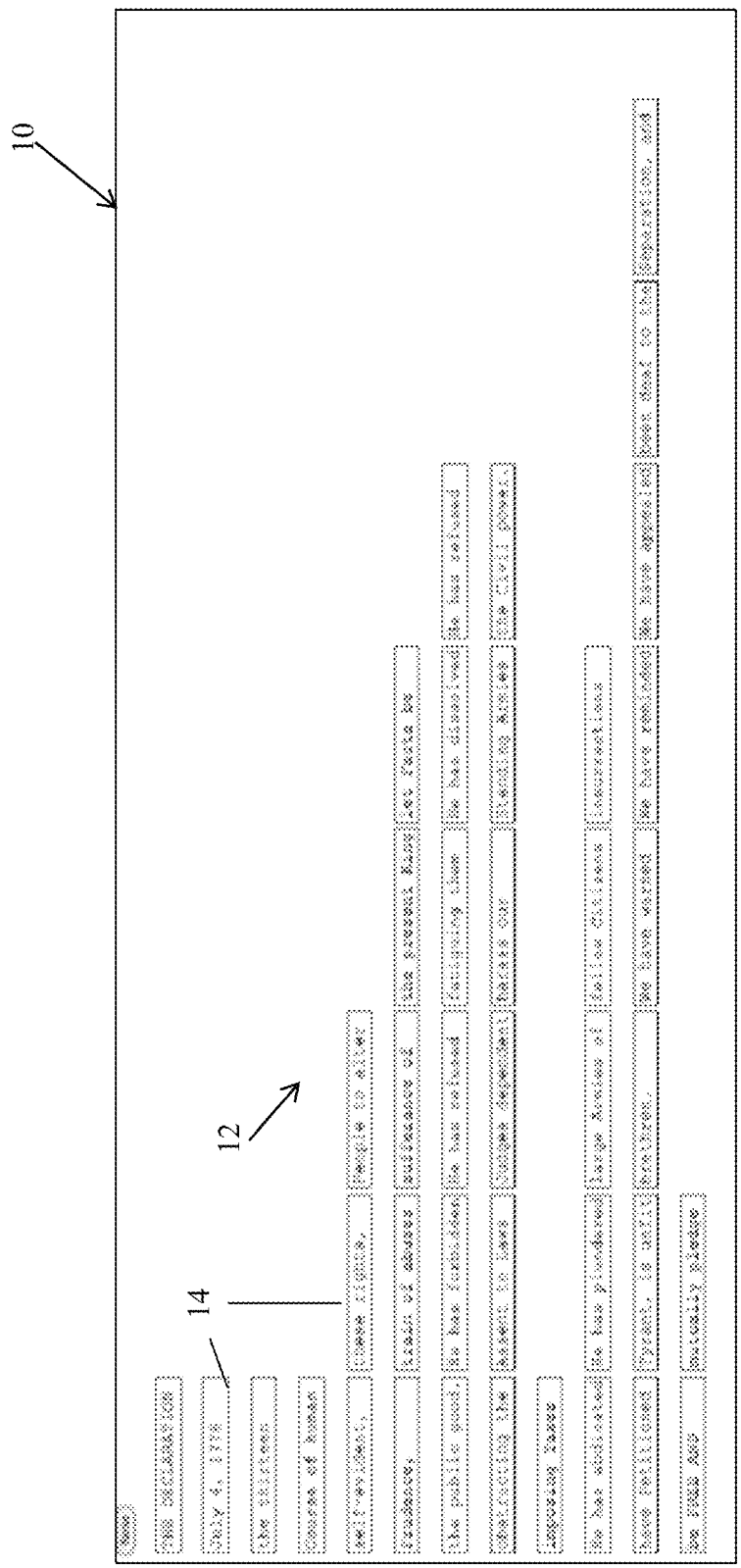
FIG. 1 illustrates, as an example, the Declaration of Independence as displayed on a display device in a display format in which the most important phrases of each sentence as selected by a user are displayed in blocks of text with the remaining portions of the Declaration of Independence not being displayed, but being continuously available for display, in accordance with an embodiment of the present invention.

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As described above, embodiments of the present invention are directed to a method of displaying information (e.g., "text") on a display device (i.e., display screen) using a display format different from typical ways of displaying information on the display device. The display format is enabled by taking advantage of the advances of technology. The display format gives a user of a display device additional control over the information the user wants to see on the display device.

The display format also gives to the user additional control over the amount of information that the user will see given any of the variable sizes of display areas that can be used. Additionally, the display format provides the user with more control over the size of information displayed on the display device. In particular, the display format allows for the information to be displayed on the display device with larger text size thereby making it easier for reading by the user. The display format also allows the user to designate important portions of the information from the remainder or the less important portions of the information. In this case, the important portions of the information are displayed on the display device while the remainder of the information is not displayed, but is still available to be viewed by the user on the display device if desired.

The method of displaying information using a display format in accordance with embodiments of the present invention takes into consideration that reading text in typical manners is fatiguing and is done in a non-natural eye movement. For instance, reading text in the left-to-right, up-to-down (Western) manner is not a natural eye movement and therefore is fatiguing. Instead, eyes prefer to move in discreet segments to focus within each segment. This is a speed-reader technique. The reason that eyes prefer to move in discreet segments to focus within each segment is because the eyes have difficulty focusing while moving. Therefore, the eyes have to stop briefly while moving in order to focus.

On the other hand, reading in segments, one or more words a time, is a more natural eye movement. It occurs quickly and subconsciously by the reader. The display format in accordance with embodiments of the present invention takes advantage of this property of the eyes. The display format reduces the amount of movement and refocusing required by the eyes and thereby reduces eyestrain and fatigue. Yet, the typical habit pattern of left-to-right reading of Western literature is generally maintained, but at a much slower rate. The display format can also apply to other cultural styles of reading.

Other professions use the knowledge that eyes prefer to move in discreet segments to focus within each segment. For instance, pilots avoid scanning in a continuous movement of their eyes across the sky because they know their eyes will not focus and they can thereby miss seeing other aircraft around them. Instead, pilots search for other aircraft in the sky by looking at approximately ten to twenty degree arcs and stopping to look and focus at each region in the sky momentarily. This process is continued until the entire visual view is scanned.

An important value of the display format in accordance with embodiments of the present invention is its ability to take advantage of the scanning weaknesses of eyes. This is a larger problem with individuals who are visually impaired. Those individuals with mental or physical impairments can also benefit from the display format because of the reduced reliance on hand-eye coordination enabled by the display format.

In one embodiment, the display format includes having only small user designated segments of each sentence visible at a time on the display device. Therefore, the information displayed on the display device will be compressed to a more manageable level with just the designated (i.e., important) segments being displayed. This thereby allows for more information to be available per display area, such as on the display screen or piece of paper. This advantage is realized on computer screens, PDAs, cellular telephones, etc.

In one embodiment, the display format allows a user to display information on a display device in an abbreviated manner. As such, the display format more useful information, as determined by the user, to be visualized per display area.

The display format in accordance with embodiments of the present invention enables information to be usefully displayed in the face of electronic devices becoming smaller. The details are at the discretion of the user (e.g., reader or author). Each user can determine by its own personal preference of what they want displayed and how much detail they will see.

The demonstrated embodiments in the FIGURES of the display format use a fixed width for the reading window of each block. As indicated above, the width of the window can be selected or changed by a user (e.g., a reader or an author) and set to a width more comfortable for the user's reading ability. In the examples illustrated herein, when a document is displayed on a display device, for each block, as many words from the beginning of the sentence, corresponding to the block, that fit into the selected window width are displayed on the display device. Alternatively, the user can default the blocks to display a fixed number of words. In this case, the width of the blocks would vary from one another.

Embodiments of the display format are not restricted to these algorithms or operations. For instance, the first noun or verb in a sentence can be the defaulted starting point for the corresponding block of text to be displayed. Also, a block of text can be assigned to start at each highlighted segment or phrase as selected by the user. In this case, the user would initially read the original document and select (e.g., highlight) segments that the user wants to be assigned to blocks of text to be displayed. The text subsequent to a given highlighted segment up to the next highlighted segment is associated with the block assigned to the given highlighted segment. Highlighting (i.e., selecting) segments of text can be accomplished by emphasizing a segment with color or other ways such as underlining, boldface, italics, etc. Any images or pictures within the text to be compressed can be selected by the user to remain in the same relative position of the text with the boxes, be removed, or moved to another location such as the end of the document.

Referring now to FIG. 1, the Declaration of Independence (i.e., a text document) as displayed on a display device 10 in a display format 12 in which the most important phrases of each sentence as selected by a user are displayed in blocks of text 14 with the remaining portions of the Declaration of Independence not being displayed, but being continuously available for display, in accordance with an embodiment of the present invention is shown. In display format 12 shown in FIG. 1, a user initially went through each sentence of the text document and selected segments of the text in each sentence that the user wants to be assigned to blocks of text 14 to be displayed. In this regard, the full Declaration of Independence with the selected segments of the text being shown as being "blocked" is reproduced below in EXAMPLE 1. Subsequently, when the user reviews this abridged version of the document as shown in FIG. 1 it is easier to find the topic that the user is searching for in this abridged version of the document as only the main points are displayed and thereby readily visible.

Two different users will likely have entirely different abridged versions of the same document for display because the users can select different segments of text that the users deem important to them.

It is to be appreciated that if the entire Declaration of Independence were displayed together on display device 10, then much smaller text size would be required due to the spatial constraints of display device 10. In contrast, as only the blocks of text 14 of the Declaration of Independence are displayed on display device 10 at a given time as shown in FIG. 1, then a much larger text size can be used for the same spatial constraints of display device 10. That is, the same size blocks of text 14 as shown in FIG. 1 can be arranged into a smaller area and still use a larger text size. This demonstrates the advantage of using this embodiment on a small-sized display screen 10.

In order to aid the user to find the blocked text in the original document, the user has the option to have the original text marked so it corresponds to the blocked text as demonstrated in the EXAMPLE 1 below. Each block of text is annotated by a black rectangle, for example. There is no restriction by color or shape for this annotation as highlighting, boldface, and underlining are other examples of annotation which can be used.

Figure 2:
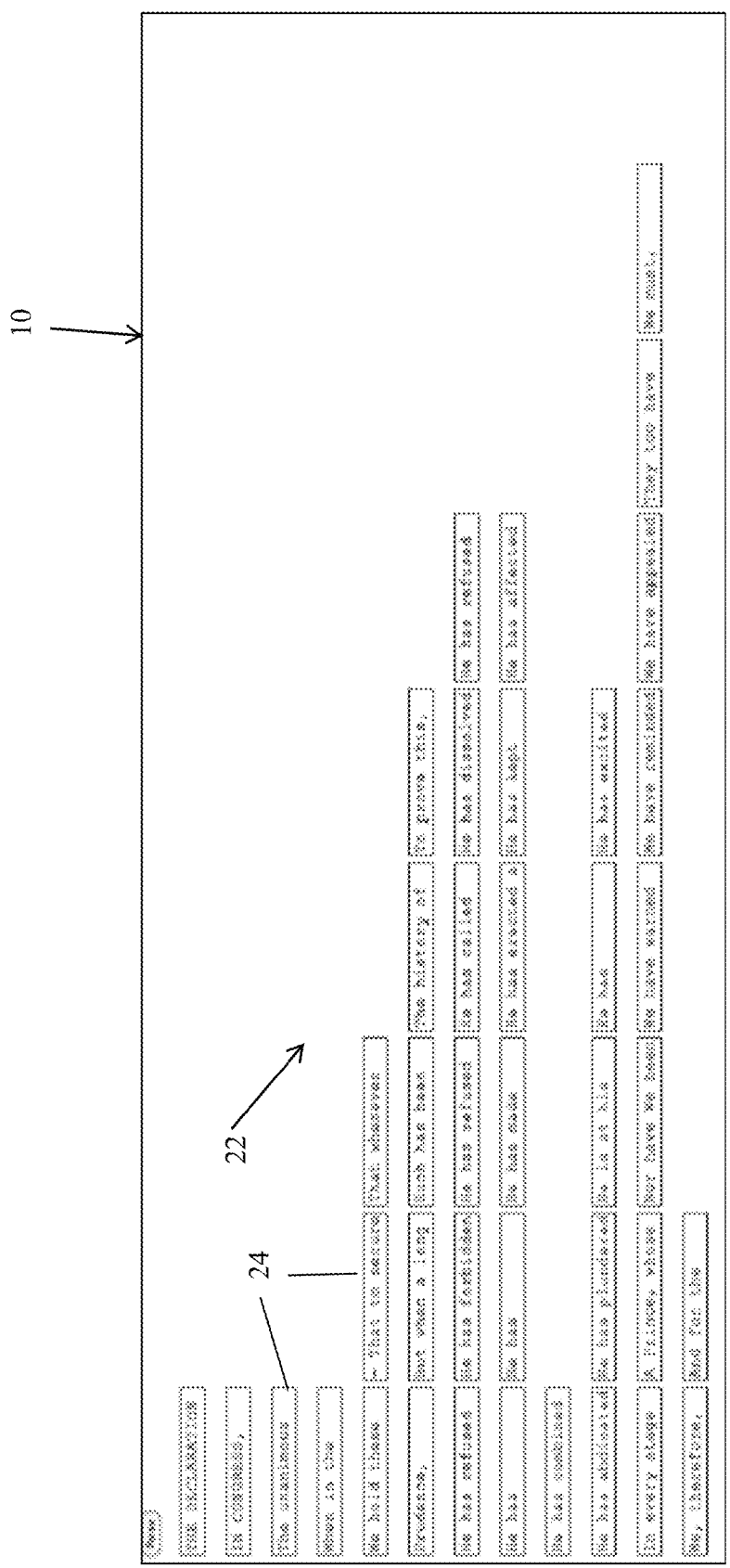
FIG. 2 illustrates the Declaration of Independence as displayed on a display device in a display format in which the first few words of each sentence are displayed in blocks of text with the remaining portions of the Declaration of Independence not being displayed, but being continuously available for display, in accordance with an embodiment of the present invention.

Referring now to FIG. 2, the Declaration of Independence as displayed on display device 10 in a display format 22 in which the first few words of each sentence are displayed in blocks of text 24 with the remaining portions of the Declaration of Independence not being displayed, but being continuously available for display, in accordance with an embodiment of the present invention is shown. In display format 22 shown in FIG. 2, each block of text 24 has the same block width and each block of text 24 corresponds to a sentence. As such, in each block 24, as many initial words of the corresponding sentence that fit into the block are displayed on display device 10 as shown in FIG. 2. This option of display format 22 mimics the technique that readers often use in scanning the initial words of sentences in order to get the gist of a document. When the user reviews this abridged version of the document as shown in FIG. 2 it is easier to get the gist of the document from this abridged version of the document.

It is to be appreciated that as the user reviews the document it can be changed to display the most important or selected phrases or segmented of text as designated by the user. As shown in FIG. 2, the document still maintains paragraph and sentence integrity when displayed in display format 22. The first, second, third, and fourth paragraphs are each one sentence long. Therefore, each of these sentences is associated with just one respective displayed block of text 24 as shown in FIG. 2. The fifth paragraph ("We hold these") is three sentences long and therefore is associated with three displayed blocks of text 24 as shown in FIG. 2. The following paragraphs and corresponding sentence pairs are listed in paragraph/sentence groups: 6/5, 7/6, 8/6, 9/1, 10/5, 11/8, and 12/2. Displayed blocks of text 24 for these remaining paragraphs and corresponding sentence pairs are in correspondence as shown in FIG. 2.

Referring now to FIGS. 3.1 through 3.6, with continual reference to FIG. 2, the Declaration of Independence as displayed on display device 10 in display format 22 in which the initial few words of each sentence are displayed in blocks of text 24 are shown. Attention is brought to block of text 24*a* which corresponds to the fifth sentence of the sixth paragraph of the Declaration of Independence. Progressing sequentially through FIGS. 3.1 through 3.4 illustrates how this fifth sentence of the sixth paragraph is displayed for a user to read. Block 24*a* shown in FIG. 3.5 at the end of this fifth sentence directs the user to the next sentence which begins with block 24*b* as shown in FIG. 3.6. This next sentence is the first sentence of paragraph seven.

As described, FIGS. 3.1 through 3.6 demonstrate how reading occurs using block 24*a* representing the fifth sentence of paragraph six. In FIGS. 3.1 through 3.5, block 24*a* is circled to identify this block. Likewise, in FIG. 3.6, block 24*b* is circled to identify this block. Scrolling sequentially through FIGS. 3.1 through 3.5 demonstrates how this sentence is displayed within block 24*a* for the user to read. The eyes never have to move or refocus for the entire sentence. After the end of the sentence a visual cue (FIG. 3.5) appears prompting the user that it is time to move on to the next sentence. The visual cue is shown in FIG. 3.5 as an arrow, but is not restricted to this form. The eyes still scan right-to-left, but not until each sentence is complete. Less total eye movement and refocusing is now required which can help to decrease eye fatigue.

Also, this form of the document as displayed according to display format 22 takes up less space than the original and the letters of each word are larger. The visually impaired should also benefit from reading with this technique as less eye motion and refocusing is required and larger size letters are available. When the user sees the visual cue and moves to the next block 24*b* (FIG. 3.6), the defaulted phrase reappear in the previous block 24*a*. The user may scroll forward through a block or go backwards to reread a previous portion of the block. Arrow keys, mouse, buttons device, a touch screen, voice activation, a timer, etc., are examples of the type of control device that can be used for this purpose. The user can also jump around from block to block with the mouse or other control device to select a block to read out of order.

In this example the user has the option to have the phrase that was being read in the active block to also be marked by something such as a yellow rectangle within the original document. This option makes it easier for the user to refer to the identical location in the original document if the reader desires to see the full text. Other methods of annotation can be used such as highlighting, boldface, underlining, etc., depending on the user's preference.

Referring now to FIGS. 4.1 through 4.10, an advanced combination of block arrangement as displayed on display device 10 in a display format 42 in accordance with an embodiment of the present invention will be described. FIGS. 4.1 through 4.10 viewed in sequential order provide a demonstration of this combination of block arrangement. When performing traditional reading a user typically, consciously and subconsciously, looks ahead of the words that the user is currently reading and looks back at the words the user has read in order to comprehend the text better. The combination of block arrangement of display format 42 allows a user to continue this practice when reading. The blocks of text, as with display format 22 described with respect to FIG. 2 and FIGS. 3.1 through 3.6, are primary blocks with each block being assigned to one sentence.

Further, the text from the Declaration of Independence to be read from the block arrangement of display format 42 as shown in FIGS. 4.1 through 4.10 is ". A Prince, whose character is thus marked by every act which may define a Tyrant, is unfit to be the ruler of a free people."

FIGS. 4.1 through 4.10 respectively illustrate the view of just a single block of text 44 and how block 44 can be modified to have an associated pre-reading block of text 46 and an associated post-reading block of text 48. Only one primary reading block 44 is shown for simplicity. All of the primary reading blocks can have a pre-reading block and a post-reading block. They can be available for all blocks all of the time or just the active block the user is reading. The visual cue is also demonstrated.

Further, each primary block can have one or more pre-reading block(s) and one or more post-reading block(s). The first pre-reading block (i.e., block 46) displays the text that is the next text to be displayed by the primary block (i.e., block 44). The second pre-reading block displays the text that is the next text to be displayed in the first pre-reading block 46. The first post-reading block (i.e., block 48) displays the text that was just removed from the primary block 44. The second post-reading block displays the text that was just removed from the first post-reading block 48. This way the text the reader is about to read and just read is still available to facilitate comprehension and reduce the amount the reader has to go backwards in a block to review a word or phrase the reader may have missed.

Nothing prohibits the creation of third or higher level pre-reading or post-reading blocks. FIGS. 4.1 through 4.10 demonstrate an arrangement where the pre-reading block(s) 46 is above the primary block 44 and the post-reading block(s) 48 is below the primary block 46. This arrangement is an example and other arrangements are available based on the user's preference or experience level. The pre-reading block 46 can just as well be left, right, or below the primary block 44 with the corresponding post-reading block 48 right, left or above the primary block 44. Also, some users may only require a pre-reading block 46 without the post-reading block 48 and vice versa.

Figure 5:
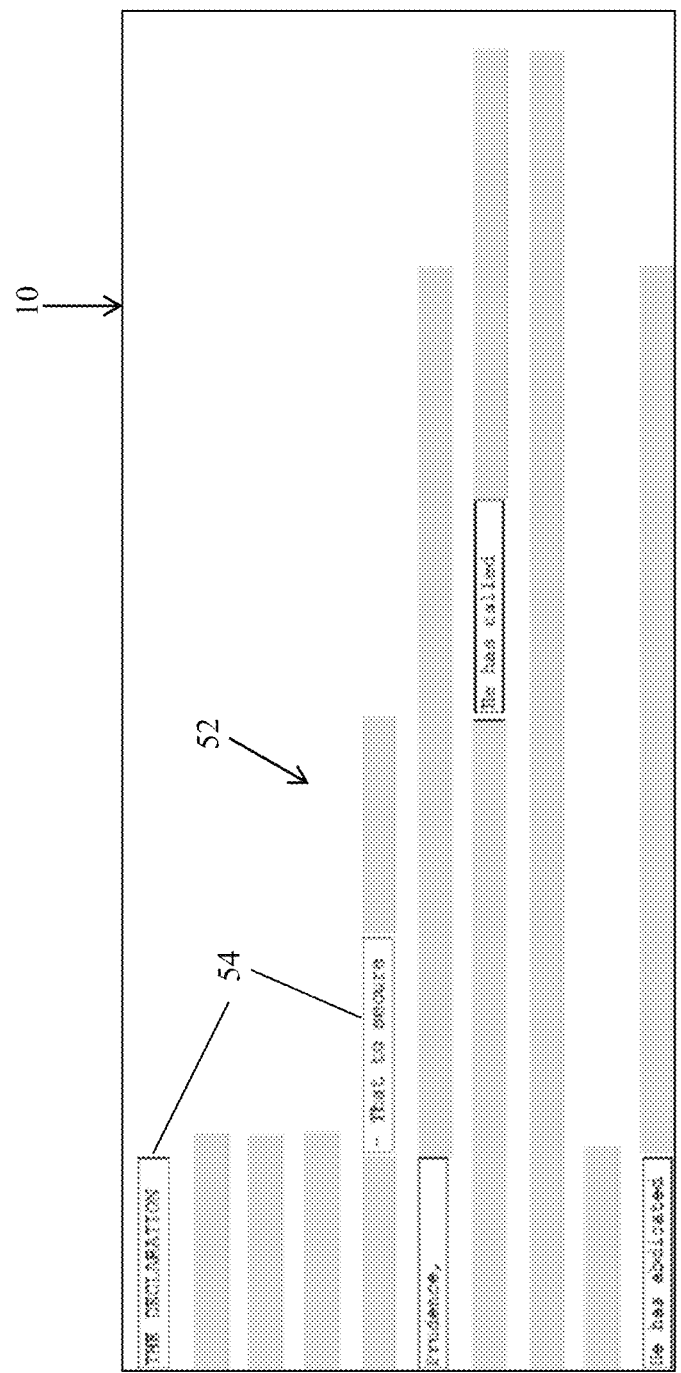
FIG. 5 illustrates the Declaration of Independence as displayed on a display device in a display format in which blocks of text corresponding to user selected highlights indicating where the user wants new blocks to begin are displayed with the remaining portions of the Declaration of Independence not being displayed, but being continuously available for display, in accordance with an embodiment of the present invention.

Referring now to FIG. 5, the Declaration of Independence as displayed on display device 10 in a display format 52 in which blocks of text 54 corresponding to user selected highlights indicating where the user wants new blocks to begin are displayed with the remaining portions of the Declaration of Independence not being displayed, but being continuously available for display, in accordance with an embodiment of the present invention is shown. This example of display format 52 includes five user-selected highlighted phrases from the full text. In this version, each user-selected phrase is set to be the beginning of a block 54. All of the subsequent text is read within this same block 54 until reaching the next user-highlighted phrase. The advantage of this option is when a user reads and highlights important information in a document all of these important highlighted phrases will show in their own block and the non-highlighted text will not be seen. The non-highlighted text will still be available for display to be read by the user as the user scrolls through the text between each block 54. The non-highlighted text is also available in the original document.

While exemplary embodiments are described above, it is not intended that these embodiments describe all possible forms of the present invention. Rather, the words used in the specification are words of description rather than limitation, and it is understood that various changes may be made without departing from the spirit and scope of the invention. Additionally, the features of various implementing embodiments may be combined to form further embodiments of the present invention.

EXAMPLE 1

The Declaration of Independence

In Congress, Jul. 4, 1776

The unanimous declaration of the thirteen united States of America.

When in the Course of human events, it becomes necessary for one people to dissolve the political bonds which have connected them with another, and to assume among the powers of the earth, the separate and equal station to which the Laws of Nature and of Nature's GOD entitle them, a decent respect to the opinions of mankind requires that they should declare the causes which impel them to the separation.

We hold these truths to be self-evident, that all men are created equal, that they are endowed by their Creator with certain unalienable Rights, that among these are Life, Liberty and the pursuit of Happiness.—That to secure these rights, Governments are instituted among Men, deriving their just powers from the consent of the governed. That whenever any Form of Government becomes destructive of these ends it is the Right of the People to alter or to abolish it, and to institute new Government, laying its foundation on such principles and organizing its powers in such form, as to them shall seem most likely to effect their Safety and Happiness.

Prudence, indeed, will dictate that Governments long established should not be changed for light and transient causes; and accordingly all experience hath shewn, that mankind are more disposed to suffer, while evils are sufferable, than to right themselves by abolishing the forms to which they are accustomed. But when a long train of abuses and usurpations, pursuing invariably the same Object evinces a design to reduce them under absolute Depotism, it is their right, it is their duty, to throw off such Government and to provide new Guards for their future security. Such has been the patient sufferance of these Colonies; and such is now the necessity which constrains them to alter their former Systems of Government. The history of the present King of Great Britain is a history of repeated injuries and usurpations, all having in direct object the establishment of an absolute Tyranny over these States. To prove this, let Facts be submitted to a candid world.

He has refused his Assent to Laws, the most wholesome and necessary for the public good. He has forbidden his Governors to pass Laws of immediate and pressing importance, unless suspended in their operation till his Assent shod be obtained; and when so suspended, he has utterly neglected to attend to them. He has refused to pass other Laws for the accommodation of large districts of people, unless those people would relinquish the right of representation in the Legislature, a right inestimable to them and formidable to tyrants only. He has called together legislative bodies at places unusual, uncomfortable, and distant from the depository of their public Records, for the sole purpose of fatiguing them into compliance with his measures. He has dissolved Representative Houses repeatedly, for opposing with manly firmness his invasions on the rights of the people. He has refused for a long time, after such dissolutions, to cause others to be elected: whereby the Legislative powers, incapable of Annihilation, have returned to the People at large for their exercise; the State remaining in the mean time exposed to all the dangers of invasion from without, and convulsions within.

He has endeavoured to prevent the populations of these States; for that purpose obstructing the Laws for Naturalization of Foreigners; refusing to pass others to encourage their migrations hither, and raising the conditions of new Appropriations of Lands. He has obstructed the Administration of Justice, by refusing his Assent to Laws for establishing Judiciary powers. He has made Judges dependent an his Will alone, for the tenure of their offices, and the amount and payment of their salaries. He has erected a multitude of New Offices, and sent hither swarms of Officers to harass our people, and eat out their substance. He has kept among us, in times of peace, Standing Armies without the Consent of our legislatures. He has affected to render the Military independent of and superior to the Civil power.

He has combined with others to subject us to a jurisdiction foreign to our constitution, and unacknowledged by our laws; giving his Assent to their Acts of pretended Legislation: For Quartering large bodies of armed troops among us: For protecting them, by a mock Trial, from punishment for any Murders which they should commit on the Inhabitants of these States; For cutting off our Trade with all parts of the world: For imposing Taxes on us without our Consent: For depriving us in many cases of the benefits of Trial by Jury: For transporting us beyond Seas to be tried for pretended offences: For abolishing the free System of English Laws in a neighbouring Province, establishing herein an Arbitrary government, and enlarging its Boundaries so as to render it at once an example and fir instrument for introducing the same absolute rule into these Colonies: For taking away our Charters, abolishing our most valuable Laws ad altering fundamentally the Forms of our Governments: For suspending our own Legislatures an declaring themselves invested with power to legislate for us in all cases whatsoever.

He has abdicated Government here, by declaring us out of his Protection and waging War against us. He has plundered our seas, ravaged our Coasts, burnt our towns, and destroyed the Lives of our people. He is at his time transporting large Armies of foreign Mercenaries to compleat the works of death, desolation and tyranny, already begun with circumstances of Cruelty and perfidy scarcely paralleled in the most barbarous ages, and totally unworthy the Head of a civilized nation. He has constrained our fellow Citizens taken Captive on the high Seas to bear Arms against their Country, to become the executioners of their friends and Brethren, or to fall themselves by their Hands. He has excited domestic insurrections amongst us, and has endeavoured to bring on the inhabitants to our frontiers, the merciless Indian Savages, whose known rules of warfare is an undistinguishable destruction of all ages, sexes and conditions.

In every stage of these Oppressions We have Petitioned for Redress in the most humble terms: Our repeated Petitions have been answered only by repeated injury. A Prince, whose character is thus marked by every act which may define a Tyrant, is unfit to be the ruler of a free people. Nor have We been wanting in attentions to our British brethren. We have warned them from time to time of attempts by their legislature to extend an unwarrantable jurisdiction over us. We have reminded them of the circumstances of our emigration and settlement here. We have appealed to their native justice and magnanimity, and we have conjured them by the ties of our common kindred to disavow these usurpations, which would inevitable interrupt our connections and correspondence. They too have been deaf to the voice of justice and of consanguinity. We must, therefore, acquiesce in the necessity, which denounces our Separation, and hold them, as we hold the rest of mankind, Enemies in War in Peace Friends.

We, therefore, the Representatives of the INITED STATES OF AMERICA, in General Congress, Assembled, appealing to the Supreme Judge of the world for the rectitude of our intentions, do, in the Names, and by Authority of the good People of these Colonies, solemnly publish and declare, That these Untied Colonies are, and of Right ought to be FREE AND INDEPENDENT STATES; that they are Absolved from all Allegiance to the British Crown, and that all political connection between them and the State of Great Britain, is and ought to be totally dissolved; and that as Free and Independent States, they have full Power to levy War, conclude Peace, contract Alliances, establish Commerce, and to do all other Acts and Things which Independent States may of right do. And for the support of this Declaration, with a firm reliance on the protection of divine Providence, we mutually pledge to each other our Lives, our Fortunes and our sacred honor.

What is claimed is:

1. A device for presenting a textual document to a user, the textual document including text having words sequentially arranged in a plurality of sentences arranged in a layout, the device comprising:
   a display screen; and
   a processor configured to
   assign blocks to the sentences, respectively, wherein the blocks have a size selected by a user,
   for each of at least two of the blocks, display only an initial portion of the words that fit within the size of the block of the sentence assigned to the block at a respective location of the display screen designated for the block, the respective locations of the display screen designated for the at least two of the blocks corresponding to the layout of the sentences in the textual document,
   for a selected one of the at least two of the blocks, convert the words of the sentence assigned to the selected block into a plurality of sequentially ordered portions of text respectively having sets of the words as sequentially arranged in the sentence and scroll display within the size of the selected block at the location on the display screen designated for the selected block the set of the words of the portions of text one portion of text at a time as the portions of text are sequentially ordered for a user to read the sentence assigned to the selected block.

2. The device of claim 1 wherein:
   the processor is further configured to display, at a second designated location on the display screen, the set of the words of the portion of text preceding the set of the words of the portion of text displayed at the location on the display screen designated for the selected block.

3. The device of claim 1 wherein:
   the processor is further configured to display, at a second designated location on the display screen, the set of the words of the portion of text subsequent to the set of the words of the portion of text displayed at the location on the display screen designated for the selected block.

4. The device of claim 2 wherein:
   the processor is further configured to display, at a third designated location on the display screen, the set of the words of the portion of text subsequent to the set of the words of the portion of text displayed at the location on the display screen designated for the selected block.

5. The device of claim 1 wherein:
   the processor is further configured to enable the user to select an amount of words of text to be included within each of the portions of text.

6. The device of claim 1 wherein:
   the processor is further configured to enable the user to select a textual length of each of the portions of text.

7. A device for presenting a textual document to a user, wherein the textual document includes text having words sequentially arranged in a plurality of textual structures arranged in a layout, wherein a textual structure is one of a sentence and a paragraph having one or more sentences, wherein the plurality of textual structures includes a plurality of sentences and a plurality of paragraphs, the device comprising:
   a display screen; and
   a processor configured to enable a user to select portions of the text in at least two textual structures of the document, the processor is further configured to respectively assign a block to each to each textual structure having a selected portion of the text, enable a user to select a size of each block, and, for each block, display only the words that fit within the size of the block, as sequentially arranged, of the selected portion of the text of the textual structure assigned to the block at a respective location of the display screen designated for the block, the respective locations of the display screen designated for the blocks corresponding to the layout of the technical structures in the textual document;
   the processor is further configured to, for each block, convert the words between the block and the next block into a plurality of sequentially ordered portions of text respectively having sets of the words as sequentially arranged in the textual structures and scroll display within the size of the block at the location on the display screen designated for the block the set of the words of the portions of text one portion of text at a time as the portions of text are sequentially ordered for a user to read.

8. The device of claim 7 wherein:
for each block, the processor is further configured to enable a user to select one of an amount of words of text to be included within the portion of text for the block and a textual length of the portion of text for the block.

* * * * *